Patented May 31, 1949

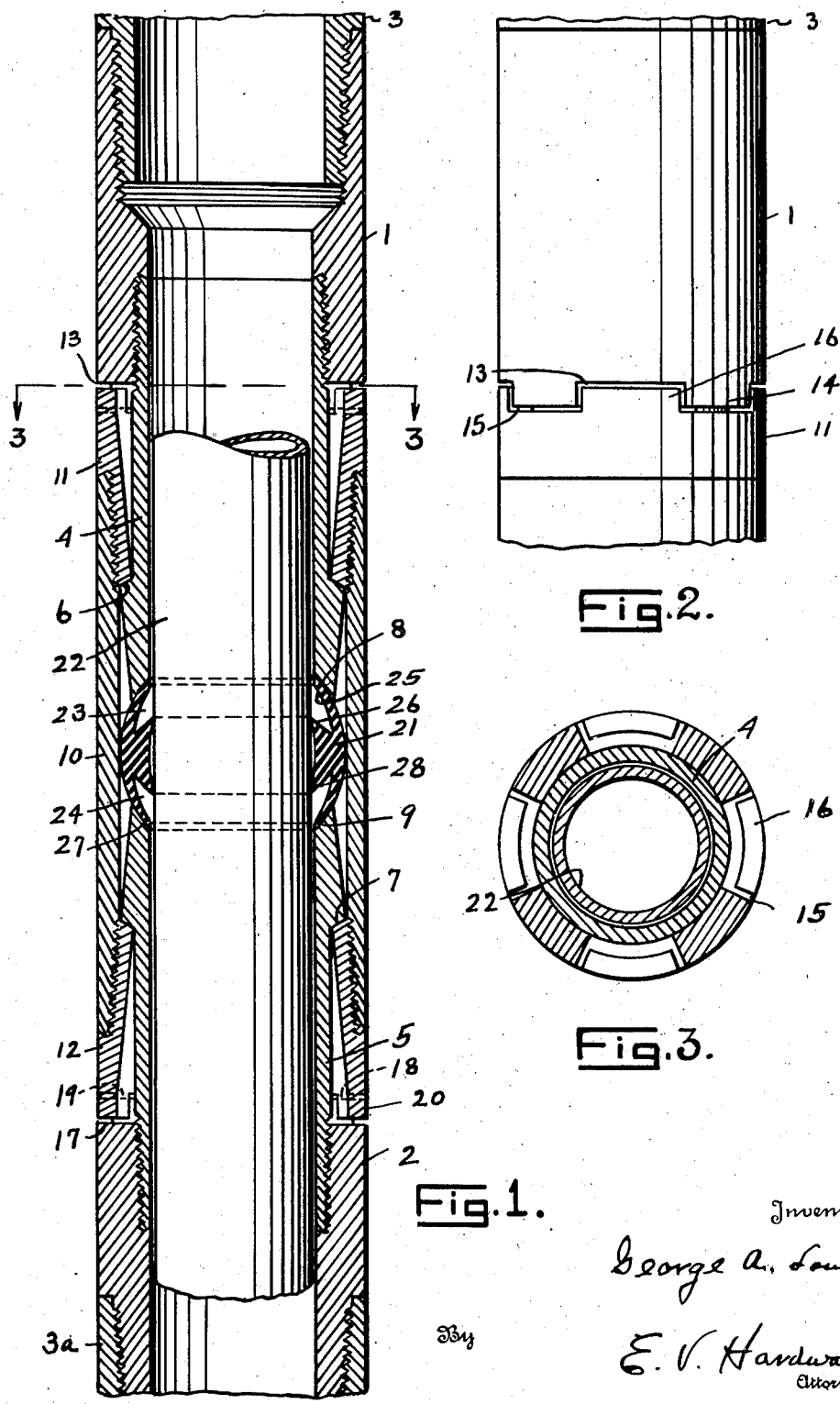

2,471,759

UNITED STATES PATENT OFFICE 2,471,759

PIPE COUPLING

George A. Lowrey, Houston, Tex.

Application December 11, 1945, Serial No. 634,239

6 Claims. (Cl. 285—146)

This invention relates to a pipe coupling.

An object of the invention is to provide a flexible type of coupling designed to be incorporated into pipes which are to be used in wells.

In carrying on operations in oil, or similar, wells, crooked bore holes are often encountered wherein it is desirable that the pipe used in carrying on the operations should flex, or bend, so as to more readily follow the course of the bore hole; also in fishing operations to remove pipe or other objects in the bore hole the upper end of the pipe may rest against one side of the bore and in order to engage the fishing tool over said end of the pipe it is desirable that the string, operating the tool, be capable of flexing so that the tool may be more readily telescoped over the pipe or other object to be pulled; also in directional drilling in order to straighten a bore hole or to side track an object stuck in the bore hole it is also desirable that the operating string, carrying the deflecting tool be capable of flexing in side tracking the object beneath. The coupling herein described has been particularly designed for such purposes, and other similar purposes, hereinabove indicated.

It is another object of the invention to provide a coupling of the character described adapted to be incorporated into an operating string and which will allow said string to flex, or bend, and by means of which torsion may be transmitted from the operating string above the coupling to the operating string beneath the coupling.

It is a further object of the invention to provide a coupling of the character which includes a seal about the inside pipe over which the coupling is telescoped.

With the above and other objects in view the invention has particular relation to certain novel features of construction, arrangement of parts and use, an example of which is given in this specification and illustrated in the accompanying drawings, wherein—

Figure 1 is a vertical, sectional view of the coupling shown telescoped over an inner pipe.

Figure 2 is a fragmentary side elevation thereof; and

Figure 3 is a cross-sectional view taken on the line 3—3 of Figure 1.

Referring now more particularly to the drawings wherein like numerals of reference designate the same parts in each of the figures, the numerals 1 and 2 designate the upper and lower tubular couplings to which upper and lower sections 3 and 3a of an operating string of pipe may be connected.

Screwed into the lower end of the upper coupling there is a tubular nipple 4 and screwed into the upper end of the lower coupling 2 there is a tubular lower nipple 5.

These respective nipples have the external upper and lower shoulders 6 and 7. The shoulder 6 tapers downwardly and outwardly and the shoulder 7 tapers upwardly and outwardly. Beyond the respective shoulders 6 and 7 the ends of said nipples taper inwardly, externally and at their extreme ends they are provided with the respective inside annular seats 8 and 9 which are concaved.

Surrounding said nipples there is the external connecting sleeve 10 and screwed into the upper and lower ends of said sleeve there are the tubular glands 11 and 12 whose inner sides are flared upwardly and downwardly, respectively, as shown, and whose inner ends abut the corresponding shoulders 6 and 7 so as to hold the upper and lower nipples 4 and 5 in assembled relation.

The lower end of the coupling 1 has the radial notches 13 extending entirely therethrough with the clutch jaws 14 between said notches and the upper end of the gland 11 has the radial notches 15 therethrough with the clutch jaws 16 between said notches. The jaws 14 intermesh with the notches 15 and the jaws 16 intermesh with the notches 13, with sufficient clearance between them, as shown in Figure 2, to permit freedom of movement, radially, between them.

The upper end of the coupling 2 has radial notches 17 similar to the notches 13, and clutch jaws 18 between said notches and the lower end of the gland 12 has radial notches 19, similar to the notches 15 with the clutch jaws 20 between them, the jaws 18 fitting into the notches 19 and the jaws 20 fitting into the notches 17 with sufficient clearance between them to permit freedom of radial movement as is also indicated in Figure 2.

Between the ends of the nipples 4 and 5 there is a resilient packing member 21 whose external contour is a spherical segment and whose ends fit snugly in the seats 8 and 9. This packing closely surrounds the inside pipe 22 over which the coupling is telescoped.

The packing 21 has the inside, circumferential grooves 23 and 24 therearound forming the inside upper lips 25, 26 and the inside lower lips 27, 28.

The pressure of the fluid in the grooves 23, 24 will hold the lips 25, 27 against the seats 8 and 9 and will hold the lips 26, 28 closely against the pipe 22 so as to form a fluid tight joint.

A construction, as above described, incorporated into an operating string of pipe will permit the pipe to readily flex, or bend, in any direction and will be sealed against leakage of the fluid within the operating string through the coupling or between the inner pipe and the coupling.

A coupling of the character described incorporated into an operating string of pipe will also transmit torque from the operating string above the coupling to the operating string beneath said coupling.

The drawings and description are illustrative merely while the broad principle of the invention will be defined by the appended claims.

What I claim is:

1. A coupling for an operating string of pipe comprising, a tubular housing, a tubular nipple extended into each end of the housing the ends of the nipples being spaced radially inwardly from the housing to allow universal movement of the nipples relative to the housing, each nipple and the corresponding end of the housing having means which interengage to prevent detachment of the nipples from the housing, a seal ring in the housing between the inner ends of the nipples, tubular string sections connected to the respective nipples and clutch means between said string sections and the corresponding nipples.

2. A flexible coupling for a tubular, operating string comprising, a tubular housing, a tubular nipple extended into each end of the housing, means between each nipple and the corresponding end of the housing adapted to interengage to prevent detachment of the nipples, each nipple being spaced from the housing on opposite sides of said interengaging means to allow lateral movement of the nipples relative to the housing, a seal ring between the inner ends of the nipples adapted to form a seal with a pipe within the coupling, operating string sections connected to the outer ends of the respective nipples and means for transmitting torque, through the coupling, from one string section to the other string section.

3. A coupling for a tubular, operating string comprising, an external tubular housing, a tubular nipple extended into each end of the housing, each nipple having an external, annular, shoulder, a gland in each end of the housing whose inner end is adapted to abut the corresponding shoulder to prevent detachment of the nipples, the inner end of each nipple being spaced from the housing and the outer end of each nipple being spaced from the corresponding gland to allow each nipple to move laterally relative to the housing, a tubular coupling member connected to the outer end of each nipple, each coupling member being clutched for rotation with its corresponding gland.

4. A flexible coupling for an operating string of pipe comprising, a tubular housing, a tubular part extended into each end of the housing, each tubular part and the corresponding end of the housing having means which interengage to prevent detachment of said tubular parts from the housing, a seal ring in the housing between the inner ends of the nipples, tubular string sections connected to the respective nipples and clutch jaws between said string sections and the corresponding nipples.

5. A flexible coupling for a tubular operating string comprising, a tubular housing, a tubular part extended into each end of the housing, means between each tubular part and the corresponding end of the housing adapted to interengage to prevent detachment of the tubular parts, each tubular part being spaced from the housing on opposite sides of said interengaging means to allow universal lateral movement of the tubular parts relative to the housing, a seal between the inner ends of the tubular parts adapted to also form a fluid tight joint with a pipe within the coupling, operating string sections connected to the outer ends of the respective tubular parts and means for transmitting torque, through the coupling, from one string section to the other string section.

6. A coupling for a tubular, operating string comprising, an external tubular housing, a tubular nipple extended into each end of the housing, each nipple having an external, annular, shoulder, a gland in each end of the housing whose inner end is adapted to abut the corresponding shoulder to prevent detachment of the nipples, the inner end of each nipple being spaced from the housing and the outer end of each nipple being spaced from the corresponding gland providing spaces which are flared in opposite directions to allow each nipple to move universally relative to the housing, a tubular coupling member connected to the outer end of each nipple, each coupling member being connected for rotation with its corresponding gland.

GEORGE A. LOWREY.

REFERENCES CITED

The following references are of record in the file of this patent:

UNITED STATES PATENTS

| Number | Name | Date |
|---|---|---|
| 781,157 | Powell | Jan. 31, 1905 |
| 1,054,812 | Zierath | Mar. 4, 1913 |
| 1,926,197 | Durr | Sept. 12, 1933 |
| 2,092,135 | Parker | Sept. 7, 1937 |